June 20, 1972   H. L. MILLER   3,671,366
ULTRASONIC WELDING OF THERMOPLASTICS
Filed June 19, 1970   2 Sheets-Sheet 2

INVENTOR
H. L. MILLER
BY Curphey & Erickson
PATENT AGENTS

United States Patent Office 3,671,366
Patented June 20, 1972

3,671,366
ULTRASONIC WELDING OF THERMOPLASTICS
Hugh L. Miller, Downsview, Ontario, Canada, assignor to Northern Electric Company Limited, Montreal, Quebec, Canada
Filed June 19, 1970, Ser. No. 47,821
Int. Cl. B06b 3/00
U.S. Cl. 156—580    4 Claims

ABSTRACT OF THE DISCLOSURE

An ultrasonic vibrating device is used to weld together a pair of strips of thermoplastic material lying coplanar and disposed above and below a plurality of wires to form a ladder strapping insulating bond. The welding operation is performed within a molding cavity which restrains any melted plastic from leaking out from between the strips, thereby preventing the formation of flash along the welded edge.

---

This invention relates to the ultrasonic welding of plastics generally, and more particularly to the method and apparatus for forming ladder strapping insulating bonds using ultrasonic welding of thermoplastics.

It is well known in the art that two pieces of thermoplastic material may be welded together by the application of ultrasonic energy to one of them. The ultrasonic energy is transferred to the mating surfaces of the two pieces and the friction generated therebetween causes the plastic to melt and flow such that when the application of the energy is stopped and the pieces are allowed to cool, the two plastic pieces form a unitary structure. This process has been used extensively in the plastics industry to produce articles such as plastic bags and thermal cups. This process has also been used to weld together a plurality of conductor wires each having a thermoplastic jacket.

However, when this process is applied to the welding of pieces of thermoplastic material having non-thermoplastic elements sandwiched therebetween, a major problem arises. The ultrasonic energy applied to one of the pieces is transmitted to its contact surface with the non-thermoplastic elements and causes the plastic in direct contact with the elements to melt and flow away from the elements. At the same time, the elements transmit some of the ultrasonic energy to the surface of the underpiece of plastic in contact therewith, with a similar result. In other words, the non-thermoplastic elements act as energy directors against the plastic surfaces as they become embedded therein. By the time that the facing surfaces of the plastic pieces come into contact, there is a substantial amount of liquid plastic therebetween and as the pieces are pressed together, some of this liquid plastic is squeezed out from between the pieces thereby causing extensive flash to be formed along the weld.

I have discovered that this problem may be overcome by placing the pieces to be welded in a molding cavity. The walls of the cavity restrain the outward flow of liquid plastic formed during the application of the ultrasonic energy, thereby preventing the formation of flash along the weld. Of course, this requires the cavity to have essentially the same dimensions as the pieces of thermoplastic material and a depth greater than the combined thickness of the underpiece of plastic material and one of the elements, such that the perimeter of the weld is contained within the cavity.

I have found that this process may be easily adapted to the forming of ladder strapping insulating bonds. Ladder strapping consists of wires held in spaced apart relationship by means of insulating bonds placed transversely across the wires so as to secure them permanently in a predetermined relationship to each other. Ladder strapping is used extensively for connecting in parallel, terminal sets in communications equipment, for example, in telephone switchboards and other similar equipment.

A well known method of forming the insulating bonds for ladder strapping involves the repetitive process of molding plastic across a series of parallel wires located in the lower portion of a molding press. The process is slow as it is necessary to preheat the plastic, introduce it to the mold and allow for curing before the next part may be molded. Flash is produced at the parting line of the mold and this is usually removed by passing the ladder strapping through a sand blasting chamber. The entire process is costly in both labor and material and involves heavy capital expenditure especially when a high degree of automation is required.

I have found that ladder strapping insulating bonds may be advantageously produced by the process of ultrasonic welding. The capital expenditures involved in setting up such a process are substantially reduced, for instance to an order of about half of what they are in setting up the molding process described above. Also, the increase in the production rate of this particular article may be of the order of six times over the previous method. As may be realized from the above, the production of ladder strapping using ultrasonic welding is a very attractive economic proposition.

In accordance with my invention, I have provided a means for supporting a pair of strips of thermoplastic material lying coplanar and having a plurality of conductor elements disposed transversely between the strips. An ultrasonic vibrating means is disposed adjacent the means and is adapted to engage a surface of one of the strips for applying ultrasonic energy thereto, thereby welding the two strips of thermoplastic material together and securing the conductor elements therebetween. The support means includes means for restraining any melted plastic resulting from the welding operation from leaking out from between the strips.

An example embodiment of my invention will now be described in conjunction with the drawings in which.

Figure 1:
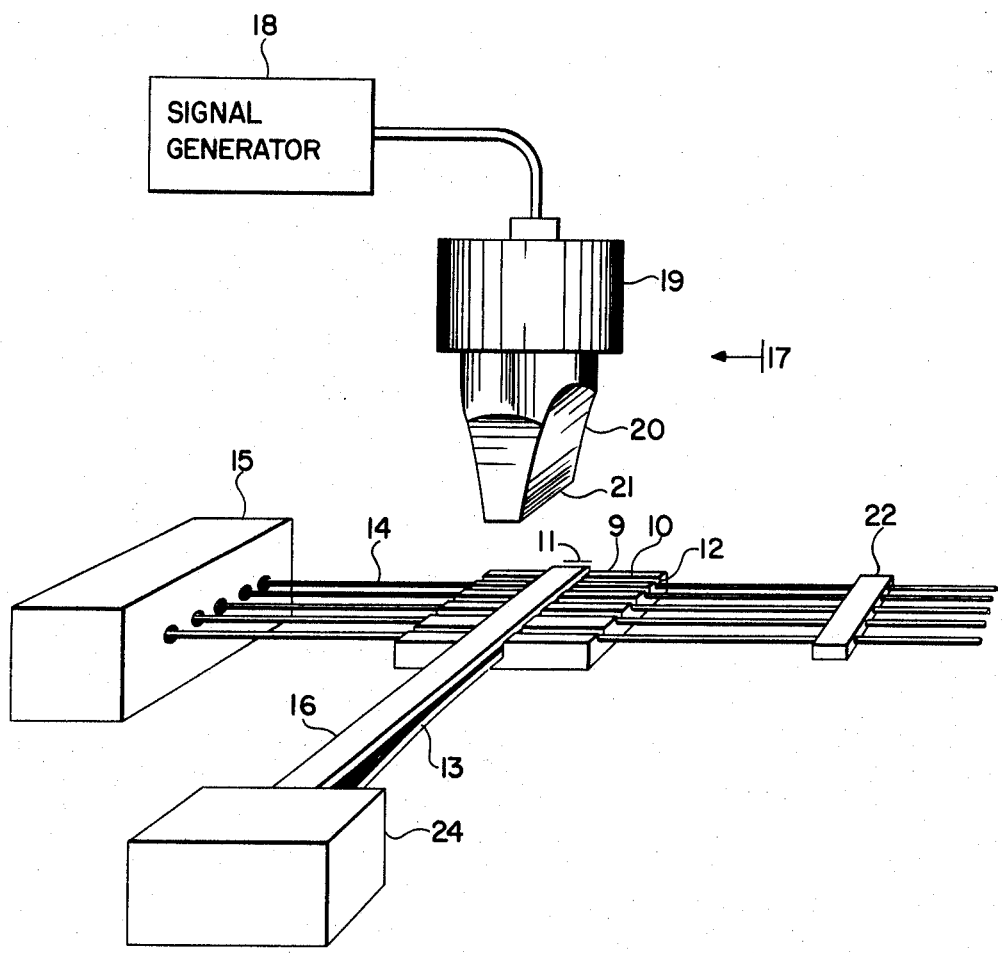
FIG. 1 is a pictorial diagram, mainly in perspective, of an apparatus which may be used to produce ladder strapping insulating bonds in accordance with my invention.

Referring to the drawings, FIG. 1 shows a jig 9 disposed centrally to the apparatus and having a channel-like molding cavity 11 opening to a surface 10. A plurality of slots 12 are formed in the surface 10 of the jig 9 in a direction transverse to that of the cavity 11. A plurality of conductor elements such as wires 14 which may be supplied from a dispenser 15 are disposed in the slots 12. First and second strips 13 and 16 respectively of thermosplastic material which may be supplied from a dispenser 24 are disposed in the cavity 11 underneath and over wires 14 to form a sandwich therewith. A completed insulating bond 22 is shown formed across the wires 14.

The ultrasonic energy necessary for the welding process may be supplied from an ultrasonic vibrating device 17. This device may consist of a high frequency generator 18 which provides electrical energy at a frequency normally above the audio spectrum, typically 20,000 hertz, to an electro-acoustic transducer 19 which converts the energy to mechanical vibrations by means of a piezoelectric element. A horn 20 coupled to the transducer 19, is shaped to distribute the pressure and ultrasonic energy necessary for the welding process evenly on the top surface of the second strip 16 of thermoplastic material contained in the cavity 11. The generator 18, together with the transducer 19, a compatible power supply (not shown in the drawings), and a suitable horn 20 may be purchased from Branson Instruments Inc., Branson Sonic Power Division, Danbury, Conn., U.S.A. The welder may consist of a Model G–17 transducer together with a Model EP–1 generator. These units may be powered with a model G–32A power supply. Since the configuration of the horn 20 depends on the shape of its face and its application, it has to be designed specifically for a particular application as is well known in the art.

Figure 2:
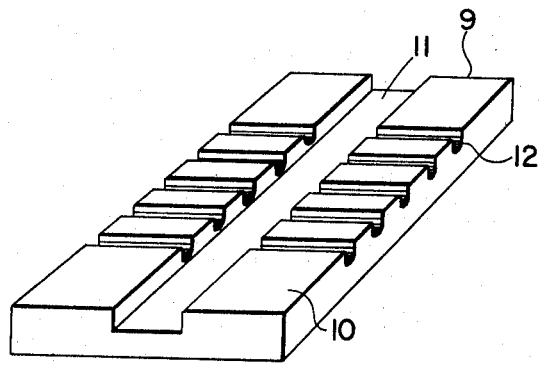
FIG. 2 is an enlarged perspective view of a jig used in the apparatus of FIG. 1.

FIG. 2 of the drawings shows an enlarged view of the jig 9 used in the apparatus of FIG. 1. The bottom of the slots 12 should ideally have a cross-section matching that of the wires 14 so as to minimize the amount of liquid plastic which might flow therein. Slots 12 should also be substantially the same width as the diameter of the wires 14 so as to constrain their lateral movement therein. Also, the distance between the bottom of the slots 12 and the bottom of the cavity 11 should be less than the thickness of the first plastic strip 13 by approximately half the diameter of one of the wires 14 to allow them to be imbedded partly into the lower strip 13. The depth of the cavity should be greater than the combined thickness of the first plastic strip 13 and any one of the conductor elements 14 to insure that the welded edge of the sandwich will be contained by the cavity 11. The jig 9 may be fastened to an anvil (not shown) or to any other suitable means of support.

Figure 3:
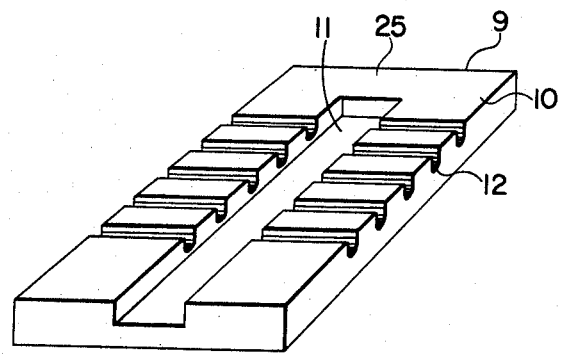
FIG. 3 is a perspective view of an alternate jig which may be used in the apparatus of FIG. 1.

FIG. 3 of the drawings shows a perspective view of an alternate jig which may be used in the apparatus of FIG. 1. There is shown a jig 9 having a cavity 11 and slots 12 formed in the surface 10 thereof. As may be observed from the drawing, cavity 11 is three sided, an end wall 25 having been added to the jig 9 shown in FIG. 2.

Figure 4:
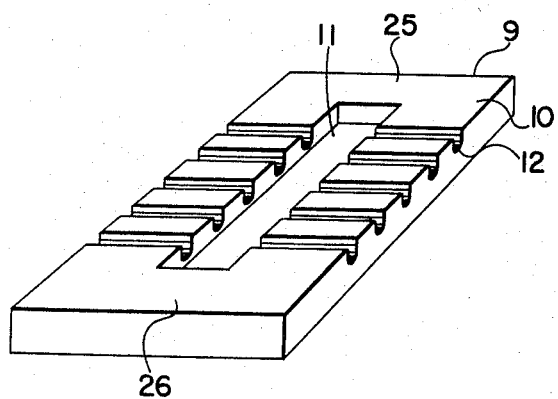
FIG. 4 is a perspective view of yet another jig which may be used in the apparatus of FIG. 1.

FIG. 4 of the drawings is a perspective view of yet another jig which may be used in the apparatus of FIG. 1. There is shown a jig 9 having a cavity 11 and slots 12. The only difference between this jig and that of FIG. 3 is that a second end wall 26 has been added to form a four sided cavity 11.

The jigs shown in FIGS. 2, 3 and 4 may be used interchangeably with the apparatus of FIG. 1 depending on the application and the mode of operation desired. The physical dimensions and limitations recited in relation to the jig 9 of FIG. 2 also apply to the jigs shown in FIGS. 3 and 4.

It should be realized, that if one wishes to weld strips of thermoplastic material having non-thermoplastic elements sandwiched therebetween using ultrasonic energy, where the non-thermoplastic elements are shorter or of the same length as the width of the cavity, then the slots 12 formed in the surface 10 of the jig 9 become unnecessary, and may be dispensed with entirely.

In operation, (referring to FIG. 1) the first strip 13 of thermoplastic material having substantially the same width as the cavity 11 and which may be obtained from the dispenser 24 is placed into the cavity 11. The plurality of wires 14 which may be obtained from the dispenser 15 are introduced into the slots 12 of the jig 9 whereby they are made to lie transversely across and in contact with the first plastic strip 13. The second strip 16 of thermoplastic material of the same width as the first strip 13 and which may also be obtained from the dispenser 24 is placed over the wires 14 and the first strip 13 at least partly into the cavity 11. The horn 20 of the ultrasonic vibrating device 17 is then brought down until its face 21 comes into contact with the top surface of the second strip 16, at which time the ultrasonic energy is applied momentarily to the assembly contained in the cavity, thereby welding the second strip of material to the first strip of material and securing permanently the conductor elements therebetween. The molding cavity 11 restrains any melted plastic from leaking out from between the strips during the application of the energy, thereby preventing the formation of flash along the weld.

A very small amount of liquid plastic may be forced into the slots 12 at their point of communication with the cavity 11 resulting in a small amount of flash along the wires 14. Normally, it has been found that this amount of flash is so small as to be unobjectionable. However, if it should be objectionable, it may be prevented by providing the jig 9 with a member having teeth-like projections adapted to fit into the slots 12 above the wires 14, so as to form continuous side walls of the cavity 11.

After the horn has assumed its normal position above the jig 9, the welded insulating bond 22 may be severed from the continuous plastic strips 13 and 16 by any conventional severing means (not shown) disposed adjacent the jig 9. The first and second strips 13 and 16 may then be re-introduced into the cavity, underneath and over a new position of the wires 14 and the whole process repeated.

It will be realized that this process is adapted to be used with fairly rigid plastic strips and therefore of substantial thickness. For example, satisfactory results may be obtained by using polystyrene strips each having a thickness of seventy thousandths of an inch and a width of two-tenths of an inch together with wires having a diameter of thirty thousandths of an inch. The cavity must have a depth greater than one hundred thousandths of an inch, and a width substantially the same as that of the strips.

It should be understood, that this method of welding thermoplastics using a molding cavity is also applicable to innumerable articles other than ladder strapping insulating bonds. This process and apparatus may be adapted to produce almost any plastic sub-assembly presently being produced by injection molding or other methods. For example, it could be used in the manufacture of terminal strips of both flat type and pile-up design.

What is claimed is:

1. An apparatus for forming ladder strapping insulating bonds, comprising:
   a jig for supporting first and second strips of thermoplastic material lying coplanar and having a plurality of conductor elements disposed transversely therebetween, said strips having substantially the same predetermined width and thickness; said jig having a channel-like cavity opening to a surface thereof, said cavity having substantially the same width as said strips and a depth greater than the combined thickness of said first strip disposed in the bottom of said cavity and one of said elements and wherein said jig includes means for accommodating said plurality of conductor elements, said means comprising linear slots formed in said surface, one for each of said conductor elements, said slots coextending across said cavity and adapted to receive and constrain the lateral movement of said conductor elements, the distance from the bottom of the slots to the bottom of the cavity being less than the thickness of said first strip by approximately half the diameter of one of said conductor elements,
   an ultrasonic vibrating device disposed adjacent said jig and adapted to engage a surface of said second strip of material, for applying ultrasonic energy thereto, thereby welding said first strip to said second strip to form an insulating bond across said elements.

2. An apparatus as defined in claim 1, further comprising,
   dispenser means for feeding continuous strip of thermoplastic material into said cavity,
   severing means disposed adjacent said jig for severing the welded insulating bond from said continuous strips.

3. An apparatus as defined in claim 1 wherein said cavity is three-sided.

4. An apparatus as defined in claim 1 wherein said cavity is four-sided.

References Cited
UNITED STATES PATENTS

| | | | |
|---|---|---|---|
| 3,499,809 | 3/1970 | Wysong | 156—580 |
| 3,440,118 | 4/1969 | Obeda | 156—73 |
| 3,386,870 | 6/1968 | Morin | 156—580 |
| 3,082,292 | 3/1963 | Gore | 156—179 |

DOUGLAS J. DRUMMOND, Primary Examiner